United States Patent [19]

Kelley et al.

[11] Patent Number: 5,038,247
[45] Date of Patent: Aug. 6, 1991

[54] METHOD AND APPARATUS FOR INDUCTIVE LOAD CONTROL WITH CURRENT SIMULATION

[75] Inventors: Gerard F. Kelley; Larry R. Hach, both of Kokomo, Ind.; James C. Tallant, II, Brighton, Mich.

[73] Assignee: Delco Electronics Corporation, Kokomo, Ind.

[21] Appl. No.: 340,813

[22] Filed: Apr. 17, 1989

[51] Int. Cl.$^5$ ............................................ H01H 47/32
[52] U.S. Cl. ..................................... 361/154; 361/152
[58] Field of Search ............... 361/152, 154, 187, 153; 123/490; 323/288

[56] References Cited

U.S. PATENT DOCUMENTS 4,536,818 8/1985 Nielsen ................................. 361/154
4,612,597 9/1986 Hamren ............................... 361/152
4,720,762 1/1988 Estes ................................... 361/154

Primary Examiner—A. D. Pellinen
Assistant Examiner—Christopher S. Schultz
Attorney, Agent, or Firm—Howard N. Conkey

[57] ABSTRACT

A control for an inductive load switches current on and off to regulate about a command value, a decaying recirculation current flowing through the load during the switch off periods. The current is sensed during the switch on periods and charges a capacitor to provide a simulation signal representing the motor current. The capacitor is allowed to discharge through a resistor during the switch off periods at the rate of the decaying recirculation current. The simulation signal is compared to the command value to control the switching. The simulation signal is sensed during a command value of zero current to determine offset errors for calibration purposes.

7 Claims, 2 Drawing Sheets

METHOD AND APPARATUS FOR INDUCTIVE LOAD CONTROL WITH CURRENT SIMULATION

FIELD OF THE INVENTION

This invention relates to method and apparatus for controlling the current to an inductive load and particularly to such method and apparatus for simulating the load current for feedback control purposes.

BACKGROUND OF THE INVENTION

When controlling current to a motor, a solenoid or other inductive load, it is frequently desired to control the current by rapidly switching the current on and off so that the average current meets a desired goal or command value. The current switching is generally accomplished by one or more switches in series with the load and the power supply. When the current is switched on it increases at a rate limited by the inductive reactance of the load. When the current is switched off it slowly decays at a rate also determined by the inductive reactance. During the current decay period a path must be provided for the current, known as induced or recirculation current.

A common motor driver circuit is an H-bridge which has two arms connected from opposite sides of the motor to the power source and two more arms connected from opposite sides of the motor to ground. Each arm contains a switch such as a power MOSFET so that by selective switch control the motor can be driven in either direction by current flowing from the power source and through the motor to ground. It is convenient to use this type of driver in conjunction with a driver interface when using a microcomputer to control the motor. As is well known, load current feedback is often desirable for comparison to the command value to achieve closed loop control. The recirculation current as well as the applied current is required to be represented by the feedback. In the case of the H-bridge configuration, the motor current is difficult to sense because it is bidirectional and a sensor would yield negative voltages at times and much circuit complexity would be required to accommodate it.

SUMMARY OF THE INVENTION

It is therefore an object of the invention to provide a method and apparatus to provide a motor or other inductive load control using a simple current feedback. It is a further object to provide such a control method and apparatus with a zero current calibration feature using the current feedback technique.

The invention is carried out by the method of controlling current in an inductive load to a command value comprising the steps of: applying current in one direction to the load, charging a capacitor to a voltage simulating the applied current, terminating the applied current whereby an induced current flows through the load after such termination, the induced current decaying at a rate determined by the load, discharging the capacitor at a rate similar to the decay rate of the induced current whereby the capacitor voltage simulates the load current for both the applied current and the induced current, and controlling the current to the load by comparing the simulated value to the command value and applying and terminating current to maintain the simulated value close to the command value.

The invention is further carried out by a circuit for controlling the current to an inductive load to a command value comprising: means for generating a command value representing a desired load current, a power source, switch means for coupling the load across the power source whereby an applied current flows in the load and through the switch means when the switch means is closed and a recirculation current flows in the load when the switch means is open, means responsive to the applied current flowing through the switch means for generating a simulation signal representing the recirculation current as well as the applied current, and means responsive to the command value and to the simulation signal for actuating the switch means to control the load current to the command value.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

The description is directed to the control of a solenoid or a motor in an H-bridge configuration but it will be recognized that it is relevant to the control of current to any inductive load.

Figure 1:
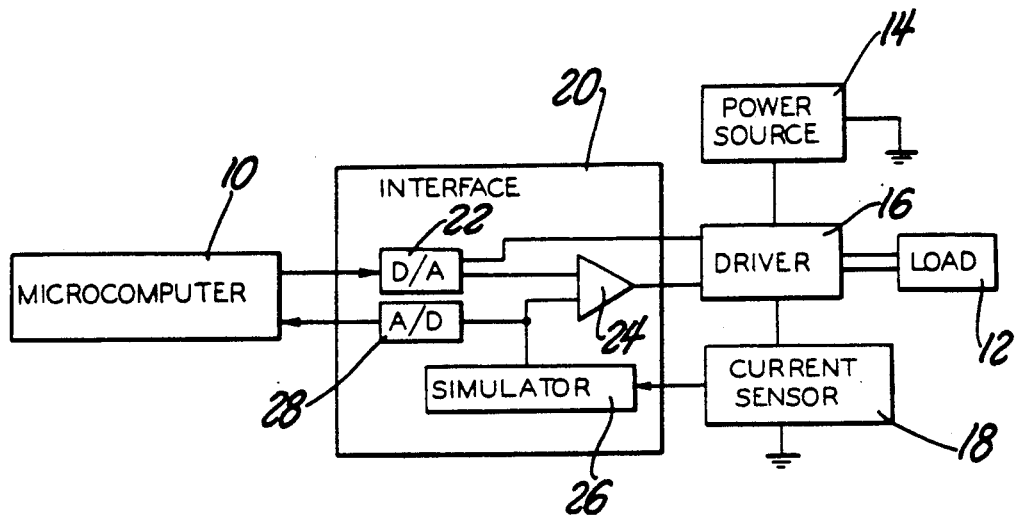
FIG. 1 is a block diagram of a control system for an inductive load according to the invention.

FIG. 1 shows a microcomputer 10 as the master control of current supplied to a load 12 from a power source 14. A driver 16 couples the power source to the load and a current sensor 18 completes the return current path between driver 16 and the power source 14. A motor driver interface 20 receives a desired current command value in the form of digital signals from the microcomputer 10 and a feedback signal from the current sensor 18 and suitably switches the driver 16 to apply an average current to the load 12 which corresponds to the command value. The interface 20 includes a D/A converter 22 which applies an analog command value to a comparator 24. A simulator 26 receives a signal from the current sensor 18 and provides a simulated load current to an input of the comparator 24. The comparator then produces an output to the driver 16 to control switching to maintain the load current near the value dictated by the command signal. Other inputs from the interface to the driver may be used in the case of a motor to determine motor direction. An A/D converter 28 encodes the simulated load current and supplies it to the microcomputer 10 which can use that information for calibration and diagnostics.

Figure 2:
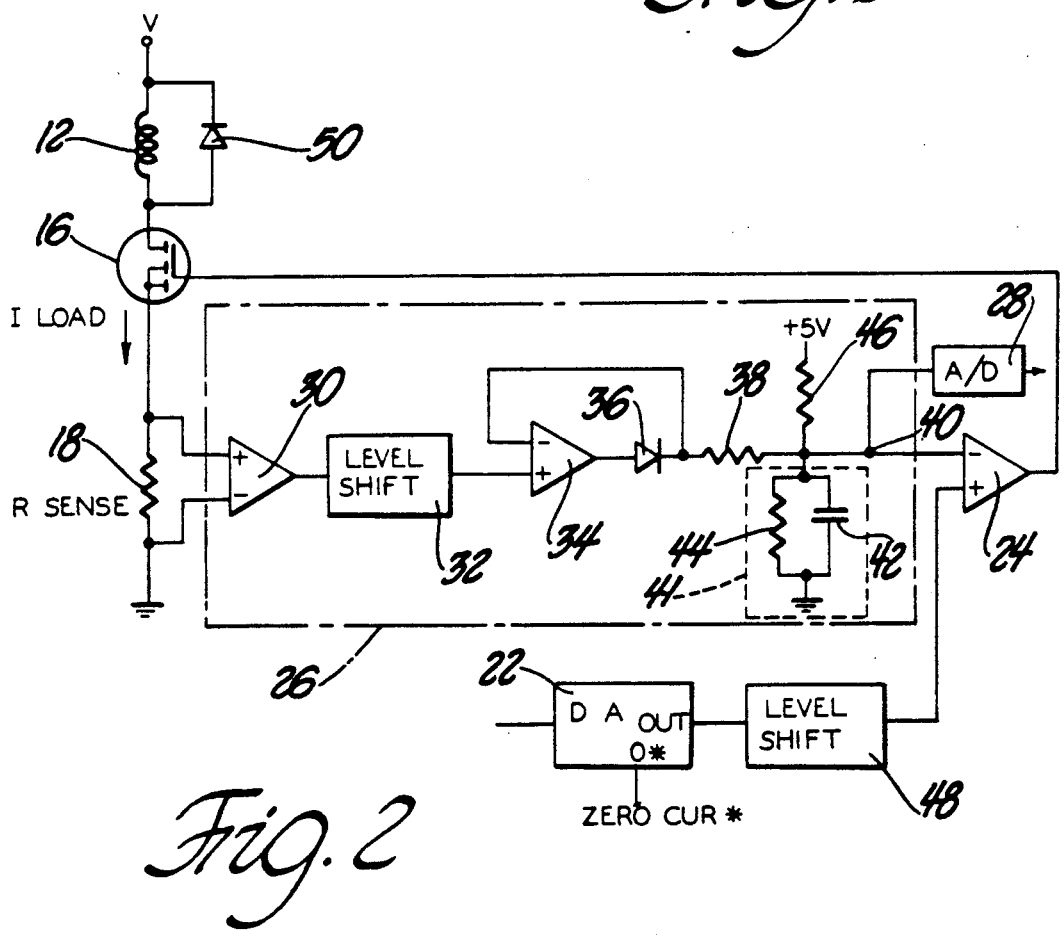
FIG. 2 is a schematic diagram of a specific control system according to the invention.

The simulator circuit 26 is shown in FIG. 2 and includes an amplifier 30 connected across the current sensor 18 which comprises a resistor, a level shift circuit 32, an amplifier 34 with a diode 36 at its output and a feedback from the cathode of the diode to the inverting input of the amplifier 34. The diode 36 is also coupled through a resistor 38 to a terminal 40. A filter circuit 41 comprising a capacitor 42 and a resistor 44 in parallel is connected between the resistor 38 and ground. A pull-up resistor 46 is connected from the terminal 40 to a 5 volt source. The values of resistors 44, 46 are chosen to develop a voltage at terminal 40 equal to the level shift voltage. This provides the controller with the capability to more accurately control the current through the load. The terminal 40 carries the simulated load current signal and is connected to the A/D converter 38 and to an input of the comparator 24. The D/A converter 22 is connected through a level shift circuit 48 to the other input of the comparator 24. The purpose of the level shift circuits 32 and 48 is to maintain the comparator at a discrete value above ground voltage to enhance its operation. In this example the load 12 is a solenoid and the driver 16 is a single MOSFET with its gate coupled to the comparator 24 output; the load 12, driver 16 and current sensor 18 are serially connected between voltage V of the power source and ground. A diode 50 is connected across the load 12 and is poled to allow recirculation current.

In operation, the comparator 24 compares the level shifted command value to the simulated load current signal at terminal 40. If the command value is larger than the current by some comparator hysteresis value, the output turns on the MOSFET to apply current from the source through the load and through the sensor 18. A voltage proportional to the load current is developed across the sensor 18 and is applied to the amplifier 30. The amplifier output is level shifted by 0.5 volt and is applied to the positive input of the amplifier 34. The amplifier 34 and the series diode 36 along with the feedback line to the inverting input of the amplifier 34 comprise a peak and hold circuit. Thus the voltage applied to the terminal 40 tracks the increasing load current but does not decrease when the load current decreases. The increasing voltage is stored on the capacitor 42 and is a measure of the load current. When the voltage at terminal 40 reaches a value above the command signal by a hysteresis amount the comparator 24 output turns off the MOSFET 16 to terminate the load current flowing through the sensor 18. A current continues to flow in the load 12 and recirculates through the diode 50. The recirculation current decays at a rate determined by the inductive load 12 but this current is not directly measured. Rather it is simulated by the capacitor 42 voltage which discharges through the resistor 44 at a rate determined by the time constant of capacitor 42 and resistor 44. The time constant is selected to effect a decay rate substantially the same as the decay rate of the recirculation current. While the rest of the circuit is suitably contained on an IC chip, the filter circuit 41 is preferably mounted externally so that the time constant can be readily tailored to the load characteristics of a particular application. Thus the voltage at the terminal 40 simulates the load current at all times. When the simulated load current signal decreases below the command level the comparator 24 again turns on the driver 16 to continue the current regulation process.

The command signal may be varied by the microcomputer 10 to dictate a corresponding variation of the load current. For example, if the load 12 is a solenoid it will require a high current to pull in the armature followed by a low holding current. Thus the command value may call for 8 amps for a few msec and then 3 amps for the remainder of the solenoid on period and finally zero current to turn off the solenoid.

Figure 3:
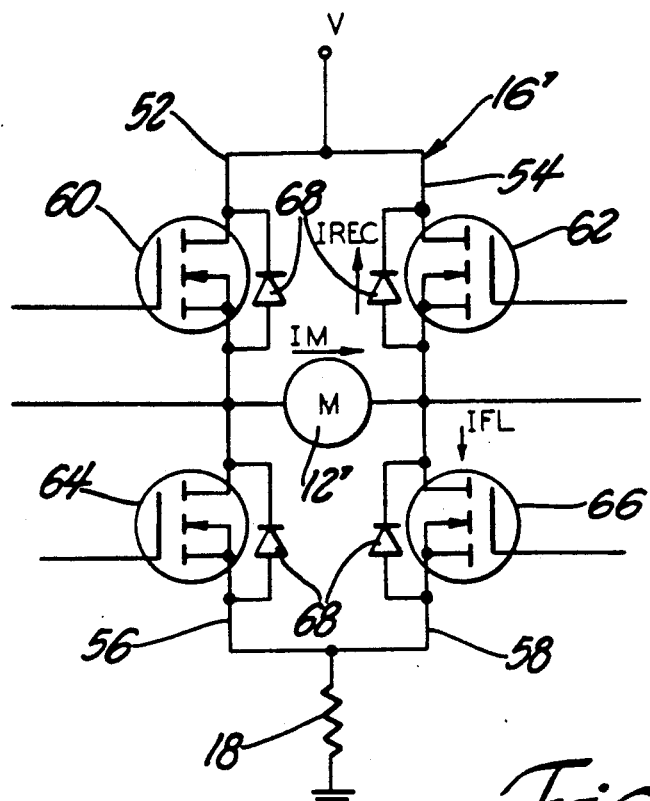
FIG. 3 is an alternate driver and motor configuration for use in the system of FIG. 2.
Figure 4:
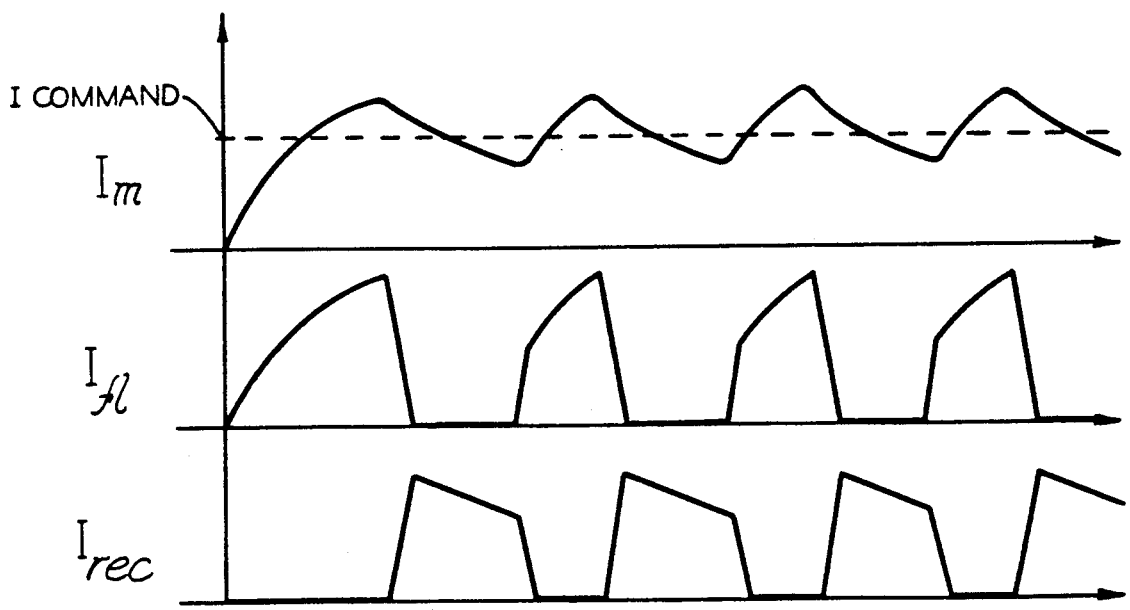
FIG. 4 is a set of current waveforms occurring in the load of FIG. 3 when under regulation according to the invention.

Another type of load is illustrated in FIG. 3 which shows a motor 12' driven by an H-bridge 16'. This load and driver is substituted for the load and driver of FIG. 2. The bridge has two upper arms 52 and 54 connected between the voltage V of a power source and opposite sides of the motor and two lower arms 56 and 58 connected between the opposite sides of the motor and the current sensor 18. The arms 52–58 contain power MOSFETs 60–66 respectively for individually switching the arms to apply current to the motor 12'. The gates of the MOSFETs are controlled by the interface 20 which has some additional logic to selectively turn on certain MOSFETs. Each MOSFET has an internal diode or body diode 68 poled to pass current in the direction opposite to the MOSFET conduction. To drive the motor forward the MOSFETs 60 and 66 are turned on so that the motor current $I_m$, as shown in FIG. 4, is initially equal to the current $I_{fl}$ which flows through the MOSFETs from V to ground. When the current exceeds the command value the MOSFET 66 is turned off but the MOSFET 60 remains on. Then the recirculation current $I_{rec}$ flows through the motor, the diode 68 of MOSFET 62 and the MOSFET 60. This current is simulated in the simulator circuit 26. As shown in FIG. 4 the MOSFET is switched at a rate to control the rise and fall times of the load currents and thus minimize radio frequency interference. When the applied current $I_{fl}$ is turned off the motor current $I_m$ is the recirculation current $I_{rec}$. When the current $I_m$ goes above or below the command value enough to switch the comparator 24, the MOSFET 66 is switched on or off to regulate the motor current. As is well known, reverse motor operation requires the MOSFETs 62 and 64 to be switched for applying $I_m$ in the opposite direction. The current regulation proceeds in the same way as for forward operation since the sensed load current always flows in the same direction through the sensor 18.

When the D/A commands a zero current the lower MOSFETs 64 and 66 are turned off while the appropriate upper MOSFET 60 or 62 remains on to permit decay of the recirculation current. Then no load current flows through the sensor 18. After enough time has elapsed for the simulated current signal to decay to essentially zero, the terminal 40 voltage is sampled by the microcomputer via the A/D converter 28 to determine the zero current reading. This value can then be added to or subtracted from the simulated current signal when current is flowing resulting in a more accurate current value. This "calibrating" can be done on a regular basis, such as each software control loop while the motor is turned off, to eliminate offset errors that may occur over time and with temperature changes. This calibration capability provides the control with improved accuracy over other types of current control circuits.

The foregoing description of a preferred embodiment of the invention for the purpose of illustrating the invention is not to be considered as limiting or restricting the invention since many modifications may be made by the exercise of skill in the art without departing from the scope of the invention.

What is claimed is:

1. A circuit for controlling the current to an inductive load to a command value comprising:
   means for generating a command value representing a desired load current,
   a power source,
   switch means for coupling the load across the power source whereby an applied current flows in the load and through the switch means when the switch means is closed and a recirculation current flows in the load when the switch means is open, means responsive to the applied current flowing through the switch means for generating a simulation signal representing the recirculation current as well as the applied current, and means responsive to the command value and to the simulation signal for actuating the switch means to control the load current to the command value.

2. The method of controlling current in an inductive load to a command value comprising the steps of:

applying current in one direction to the load, charging a capacitor to a voltage simulating the applied current, terminating the applied current whereby an induced current flows through the load after such termination, the induced current decaying at a rate determined by the load, discharging the capacitor at a rate similar to the decay rate of the induced current whereby the capacitor voltage simulates the load current for both the applied current and the induced current, and controlling the current to the load by comparing the simulated value to the command value and applying and terminating current to maintain the simulated value close to the command value.

3. The method of claim 1 further including the steps of sampling the load current when the command value is for zero current to determine offset errors, and adjusting the command value for non-zero current conditions to compensate for the offset.

4. The method of controlling current in an inductive load to a command value comprising the steps of:

applying current in one direction to the load, charging a capacitor to a voltage simulating the applied current, terminating the applied current when the simulated value exceeds the command value whereby an induced current flows through the load after such termination, the induced current decaying at a rate determined by the load, discharging the capacitor at a rate similar to the decay rate of the induced current whereby the capacitor voltage simulates the load current for both the applied current and the induced current, and repeating the above steps each time the simulated value falls below the command value, whereby the load current is held close to the command value.

5. A circuit for controlling the current to a motor to a command value comprising:

means for generating a command value representing a desired motor current, a power source, an H-bridge coupling the motor to the power source, the H-bridge having four arms with a power MOSFET in each arm for controllably switching the motor into circuit with the power source to input applied current to the motor and for allowing motor recirculation current to flow when the applied current is switched off, a current sense resistor in circuit with the power source and two of the MOSFETs in one side of the bridge so that a feedback voltage proportional to the motor current is developed when either of the said two MOSFETs is conducting, means responsive to the feedback voltage for simulating the motor current when the applied current is on as well as when it is off, and comparison means for comparing the simulated motor current with the command value to control the MOSFETs to achieve the desired motor current.

6. The circuit of claim 5 wherein the means for simulating the motor current comprises a resistor and capacitor circuit for storing a voltage representing the applied current and for permitting decay of the stored voltage at a rate representing the decay rate of the recirculation current so that the stored voltage simulates the motor current.

7. The circuit of claim 5 further including means for setting the command value to zero, whereby any variation of the simulated motor current from a value representing zero current reveals offset errors, and calibration means in the command value generating means responsive to the simulated motor current for compensating for zero offset errors.

* * * * *